(12) United States Patent
Chen et al.

(10) Patent No.: US 11,306,200 B2
(45) Date of Patent: Apr. 19, 2022

(54) METHOD FOR PREPARING ORGANOMETALLIC COMPOSITE MATERIAL

(71) Applicant: Changzhou University, Changzhou (CN)

(72) Inventors: Qun Chen, Changzhou (CN); Haiqun Chen, Changzhou (CN); Jian Lu, Changzhou (CN); Chunping Fang, Changzhou (CN); Wen Yi, Changzhou (CN); Feng Li, Changzhou (CN); Shuhua Wang, Changzhou (CN); Zhongjing Chen, Changzhou (CN); Lina Zhang, Changzhou (CN); Mingyang He, Changzhou (CN)

(73) Assignee: Changzhou University, Changzhou (CN)

( * ) Notice: Subject to any disclaimer, the term of this patent is extended or adjusted under 35 U.S.C. 154(b) by 100 days.

(21) Appl. No.: 16/858,739

(22) Filed: Apr. 27, 2020

(65) Prior Publication Data

US 2020/0407542 A1    Dec. 31, 2020

(30) Foreign Application Priority Data

Jun. 27, 2019 (CN) .......................... 201910566881.6

(51) Int. Cl.
| | | |
|---|---|---|
| C08L 27/06 | (2006.01) | |
| C08K 5/098 | (2006.01) | |
| C08K 3/26 | (2006.01) | |
| C08K 3/04 | (2006.01) | |
| C08K 3/30 | (2006.01) | |
| C08K 3/22 | (2006.01) | |
| C08K 7/02 | (2006.01) | |
| B29C 48/00 | (2019.01) | |
| B29C 48/88 | (2019.01) | |
| B29K 27/06 | (2006.01) | |

(52) U.S. Cl.
CPC ............ C08L 27/06 (2013.01); B29C 48/022 (2019.02); B29C 48/911 (2019.02); C08K 3/041 (2017.05); C08K 3/22 (2013.01); C08K 3/26 (2013.01); C08K 3/30 (2013.01); C08K 5/098 (2013.01); C08K 7/02 (2013.01); B29K 2027/06 (2013.01); C08K 2003/2241 (2013.01); C08K 2003/262 (2013.01); C08K 2003/265 (2013.01); C08K 2003/3045 (2013.01); C08K 2201/005 (2013.01)

(58) Field of Classification Search
CPC ................................ C08L 27/06; C08K 3/041
See application file for complete search history.

*Primary Examiner* — Wenwen Cai
(74) *Attorney, Agent, or Firm* — Idea Intellectual Limited; Margaret A. Burke; Sam T. Yip

(57) ABSTRACT

The present invention provides a method for preparing organometallic composite material, comprising: providing PVC resin, activated calcium carbonate, plant fiber, calcium stearate, barium sulfate, paraffin, sodium bicarbonate, zinc laurate, nanometre titanium dioxide, organometallic salt, shell powder, carbon nanotube, talcum powder and stabilizer; mixing and heating; subject to first cooling after extrusion and second cooling under vacuum; towing to obtain the organometallic composite material, wherein the organometallic salt is a benzoic acid metal salt mixture. The present method can significantly reduce the processing temperature of PVC composite by 20 to 50° C., and also increase the toughness and strength of the material so as to alleviate the exudation of the composite material as in the conventional technologies and extend the lifespan of the composite material.

10 Claims, No Drawings

METHOD FOR PREPARING ORGANOMETALLIC COMPOSITE MATERIAL

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

This application claims priority from Chinese patent application number 2019105668816 filed on Jun. 27, 2019; the disclosure of which is incorporated herein by reference in their entirety.

TECHNICAL FIELD

This present invention relates to the technical field of chemical industry. More particularly, it relates to a method for preparing organometallic composite material.

BACKGROUND

With the increasingly short of global resources, people's awareness of environmental protection is rising, and people demand higher requirements for products in production and life. During the usage, the existing PVC composite materials contain some ester plasticizers, which are used to improve the flexibility of the composite materials so as to reduce the melting temperature and make it easier to process. However, these conventional plasticizers usually have some problems. The most serious one is the exudation of plasticizer. After the exudation of plasticizer, the material will become hard, brittle, and even fracture, thus shortening the lifespan of the composite material. Moreover, the exudation will also have a great impact on the water environment. Therefore, instead of the conventional plasticizers, it is necessary to find some more stable material which is difficult to exudate.

SUMMARY OF THE INVENTION

This section aims to summarize some aspects of the embodiments of the present invention and to briefly describe some preferred embodiments. The simplification or omission may be made in this section, the abstract of the specification, and the title to avoid obscuring the purpose of this section, the abstract of the specification, and the title. Such simplification or omission may not be used to limit the scope of the present invention.

The present invention has been made in view of the above-mentioned technical drawbacks and provides a method for preparing organometallic composite material to solve the exudation problem of PVC composite material, comprising mixing a PVC resin, an activated calcium carbonate, a plant fiber, a calcium stearate, a barium sulfate, a paraffin, a sodium bicarbonate, a zinc laurate, a nanometre titanium dioxide, an organometallic salt, a shell powder, a carbon nanotube, a talcum powder and a stabilizer with heating to obtain a first mixture; extruding the first mixture and being subject to first cooling, followed by second cooling the first mixture under vacuum; and towing the first mixture to obtain the organometallic composite material.

In an embodiment, the organometallic composite material is a benzoic acid metal salt mixture, and the benzoic acid metal salt is represented by the following formula:

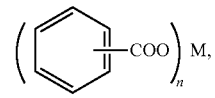

wherein n=1, 2 or 3; M includes one or more cations of copper, iron, zinc, magnesium, and/or calcium; wherein the benzoic acid metal salt mixture includes one or more of benzoic acid metal salt, dibenzoic acid metal salt, tribenzoic acid metal salt or any combination thereof; wherein the polymerization degree is approximately from 800 to 1300; wherein the amount of benzoic acid metal salt is in a range from 70% to 80% by weight, and the dibenzoic acid metal salt is from 60% to 70% by weight of the remaining benzoic acid metal salt mixture other than the benzoic acid metal salt; wherein the polymerization degree is approximately from 1000 to 1300.

In an embodiment, the PVC resin is from 50 to 70 parts by mass; the activated calcium carbonate is from 16 to 30 parts by mass; the plant fiber is from 2 to 6 parts by mass; the calcium stearate is from 4 to 14 parts by mass; the barium sulfate is from 2 to 8 parts by mass; the paraffin is from 12 to 18 parts by mass; the sodium bicarbonate is from 1 to 3 parts by mass; the zinc laurate is from 2 to 6 parts by mass; the nanometre titanium dioxide is from 4 to 8 parts by mass; the organometallic salt is from 10 to 50 parts by mass; the shell powder is from 4 to 8 parts by mass; the carbon nanotube is from 2 to 4 parts by mass; the talcum powder is from 3 to 5 parts by mass and the stabilizer is from 2 to 4 parts by mass.

In an embodiment, the mixing with heating comprises a first mixing and heating with a first speed from 400 to 500 r/min for 1 to 2 hours at a first temperature from 100 to 120° C., and a second mixing and heating with a second speed from 80 to 120 r/min for 30 to 50 minutes at a second temperature from 30 to 40° C.; wherein first settings for the extruding are 110 to 120° C. (zone 1), 125 to 135° C. (zone 2), 140 to 150° C. (zone 3), 165 to 175° C. (zone 4), and 105 to 110° C. (confluence core); wherein the cooling is water cooling; wherein a third temperature of the cooling under vacuum is from −10 to −15° C.

In an embodiment, an organometallic composite material is made by the method of the present invention.

In an embodiment, the exudation rate of the organometallic composite material prepared by the method of the present invention is from 0.3% to 15%.

The benefits of the present invention include: Firstly, the method for preparing organometallic composite material is simple, with low production cost, with fast dispersion speed, with high productivity and free of pollution and waste during the preparation. The composite material can be simply processed and recycled after being discarded, meeting the requirements for environmental protection; the utilization of wood and steel is reduced, the ecological resources are saved, and the environment is protected. Secondly, comparing with the conventional plasticizers, addition of the organometallic salts can reduce the processing temperature by 20 to 50° C. and energy consumption of the composite material and also increase the toughness and strength of the material so as to alleviate the exudation of the conventional composite and extend the service life of the composite material.

DETAILED DESCRIPTION

Example 1

60 parts of PVC resin (polymerization degree is 800 to 1300, the density is 1.38 g/cm³), 23 parts of activated calcium carbonate, 2 parts of plant fiber (mixture of bagasse, cotton and crop straw), 9 parts of calcium stearate, 2 parts of barium sulfate, 12 parts of paraffin, 1 part of sodium bicarbonate, 2 parts of zinc laurate, 4 parts of nanometre titanium dioxide (particle size 60 to 80 nm), 30 parts of organometallic salts, 4 parts of shell powder, 2 parts of carbon nanotubes (density: 2.1 g/cm³ at 20° C.), 3 parts of talcum powder and 2 parts of stabilizer (Barium-Zinc stabilizer, liquid) are provided, wherein the organometallic salts are benzoic acid metal salt mixture (purchased from Adamant Technological Environmental, forming agent, catalogue no.: WY-68) which has the following formula:

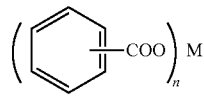

wherein n=1, 2 or 3; and M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into a high-speed mixer, where the temperature is increased to 101° C., the mixing speed is 450 r/min, and mixing time is for 1.1 hours; after the dispersion, the temperature is reduced to 31° C., the mixing speed is adjusted to 80 r/min, and the mixing time is 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −11° C., cooled in vacuum, towed, to obtain the final product.

Example 2

50 parts of PVC resin (polymerization degree is 1300, the density is 1.38 g/cm³), 16 parts of activated calcium carbonate, 2 parts of plant fiber (mixture of bagasse, cotton and crop straw), 6 parts of calcium stearate, 2 parts of barium sulfate, 12 parts of paraffin, 1 part of sodium bicarbonate, 2 parts of zinc laurate, 4 parts of nanometre titanium dioxide (particle size 60 to 80 nm), 10 parts of organometallic salts, 4 parts of shell powder, 2 parts of carbon nanotubes (density: 2.1 g/cm³ at 20° C.), 3 parts of talcum powder and 2 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

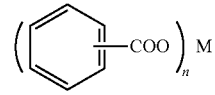

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into a high-speed mixer, where the temperature is increased to 110° C., the mixing speed is 400 r/min, and mixing time is 1.5 hours; after the dispersion, the temperature is reduced to 35° C., the speed is adjusted to 105 r/min, and mixed for 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −10° C., cooled in vacuum, towed, to obtain the final product.

Example 3

65 parts of PVC resin (polymerization degree is 1100, the density is 1.38 g/cm³), 24 parts of activated calcium carbonate, 3 parts of plant fiber (mixture of bagasse, cotton and crop straw), 10 parts of calcium stearate, 3 parts of barium sulfate, 14 parts of paraffin, 2 parts of sodium bicarbonate, 3 parts of zinc laurate, 6 parts of nanometre titanium dioxide (particle size 60 to 80 nm), 40 parts of organometallic salts, 5 parts of shell powder, 3 parts of carbon nanotubes (density: 2.1 g/cm³ at 20° C.), 3.5 parts of talcum powder and 2.5 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

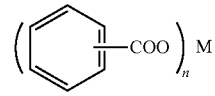

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into a high-speed mixer, where the temperature is increased to 120° C., the mixing speed is 500 r/min, and mixing time is 2 hours; after the dispersion, the temperature is reduced to 40° C., the mixing speed is adjusted to 120 r/min, and mixed for 50 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −15° C., cooled in vacuum, towed, to obtain the final product.

Example 4

70 parts of PVC resin (polymerization degree is 1200, the density is 1.38 g/cm³), 30 parts of activated calcium carbonate, 6 parts of plant fiber (mixture of bagasse, cotton and crop straw), 12 parts of calcium stearate, 8 parts of barium sulfate, 18 parts of paraffin, 3 parts of sodium bicarbonate, 6 parts of zinc laurate, 8 parts of nanometre titanium dioxide (particle size 60 to 80 nm), 50 parts of organometallic salts, 8 parts of shell powder, 4 parts of carbon nanotubes (density: 2.1 g/cm³ at 20° C.), 5 parts of talcum powder and 4 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) and its formula is as follows:

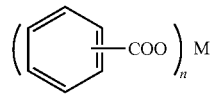

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into the high-speed mixer, where the temperature is increased to 90° C., the mixing speed to 450 r/min, and mixing time is 2 hours; after the dispersion, the temperature is reduced to 35° C., the mixing speed is adjusted to 120 r/min, and mixing time is 35 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −13° C., cooled in vacuum, towed, to obtain the final product.

Example 5

60 parts of PVC resin (polymerization degree is 1300, the density is 1.38 g/cm³), 23 parts of activated calcium carbonate, 2 parts of plant fiber (mixture of bagasse, cotton and crop straw), 9 parts of calcium stearate, 2 parts of barium sulfate, 12 parts of paraffin, 1 part of sodium bicarbonate, 2 parts of zinc laurate, 4 parts of nanometre titanium dioxide (particle size 60 to 80 nm), 30 parts of organometallic salts, 4 parts of shell powder, 2 parts of carbon nanotubes (density: 2.1 g/cm³ at 20° C.), 3 parts of talcum powder and 2 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

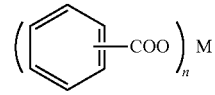

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into the high-speed mixer, where the temperature is increased to 110° C., the mixing speed is 400 r/min, and mixing time is 1.5 hours; after the dispersion, the temperature is reduced to 35° C., the mixing speed is adjusted to 105 r/min, and mixing time is 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −10° C., cooled in vacuum, towed, and obtain the final product.

Example 6

65 parts of PVC resin (polymerization degree is 1100, the density is 1.38 g/cm³), 24 parts of activated calcium carbonate, 3 parts of plant fiber (mixture of bagasse, cotton and crop straw), 10 parts of calcium stearate, 3 parts of barium sulfate, 14 parts of paraffin, 2 parts of sodium bicarbonate, 3 parts of zinc laurate, 6 parts of nanometre titanium dioxide (particle size 60 to 80 nm), 40 parts of organometallic salts, 5 parts of shell powder, 3 parts of carbon nanotubes (density: 2.1 g/cm³ at 20° C.), 3.5 parts of talcum powder and 2.5 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

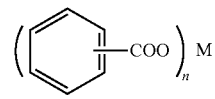

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into the high-speed mixer, the temperature is increased to 120° C., the mixing speed is 500 r/min, and mixing time is 2 hours; after the dispersion, the temperature is reduced to 40° C., the mixing speed is adjusted to 120 r/min, and mixing time is 50 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −15° C., cooled in vacuum, towed, to obtain the final product.

Example 7

70 parts of PVC resin (polymerization degree is 1300, the density is 1.38 g/cm$^3$), 30 parts of activated calcium carbonate, 6 parts of plant fiber (mixture of bagasse, cotton and crop straw), 12 parts of calcium stearate, 8 parts of barium sulfate, 18 parts of paraffin, 3 parts of sodium bicarbonate, 6 parts of zinc laurate, 8 parts of nanometre titanium dioxide (particle size 60 to 80 nm), 50 parts of organometallic salts, 8 parts of shell powder, 4 parts of carbon nanotubes (density: 2.1 g/cm$^3$ at 20° C.), 5 parts of talcum powder and 4 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

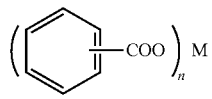

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are into the high-speed mixer, the temperature is increased to 90° C., the mixing speed is 450 r/min, and mixing time is 2 hours; after the dispersion, the mixing temperature is reduced to 35° C., the mixing speed is adjusted to 120 r/min, and the mixing time is 35 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −13° C., cooled in vacuum, towed, to obtain the final product.

Example 8

60 parts of PVC resin (polymerization degree is 1000, the density is 1.38 g/cm$^3$), 23 parts of calcium carbonate, 2 parts of plant fiber (mixture of bagasse, cotton and crop straw), 9 parts of calcium stearate, 2 parts of barium sulfate, 12 parts of paraffin, 1 part of sodium bicarbonate, 2 parts of zinc laurate, 4 parts of nanometre titanium dioxide (particle size 60 to 80 nm), 30 parts of organometallic salts, 4 parts of shell powder, 2 parts of carbon nanotubes (density: 2.1 g/cm$^3$ at 20° C.), 3 parts of talcum powder and 2 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

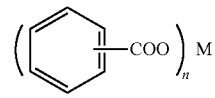

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into the high-speed mixer, where the temperature is increased to 101° C., the mixing speed is 450 r/min, and mixing time is 1.1 hours; after the dispersion, the temperature is reduced to 31° C., the mixing speed is adjusted to 80 r/min, and mixing time is 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −11° C., cooled in vacuum, towed, and obtain the final product.

Example 9

60 parts of PVC resin (polymerization degree is 1000, the density is 1.38 g/cm$^3$), 23 parts of activated calcium carbonate, 2 parts of plant fiber (mixture of bagasse, cotton and crop straw), 9 parts of calcium stearate, 2 parts of barium sulfate, 12 parts of paraffin, 1 part of sodium bicarbonate, 2 parts of zinc laurate, 4 parts of nanometre titanium dioxide (particle size 60 to 80 nm), 30 parts of organometallic salts, 4 parts of shell powder, 2 parts of carbon nanotubes (density: 2.1 g/cm$^3$ at 20° C.), 3 parts of talcum powder and 2 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

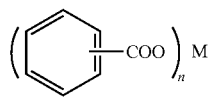

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into the high-speed mixer, raise the temperature to 101° C., the mixing speed is 450 r/min, and mixing time is 1.1 hours; after the dispersion, the temperature is reduced to 31° C., the mixing speed is adjusted to 80 r/min, and the mixing time is 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −11° C., cooled in vacuum, towed, to obtain the final product.

Example 10

60 parts of PVC resin (polymerization degree is 900, the density is 1.38 g/cm$^3$), 23 parts of activated calcium carbonate, 2 parts of plant fiber (mixture of bagasse, cotton and crop straw), 9 parts of calcium stearate, 2 parts of barium sulfate, 12 parts of paraffin, 1 part of sodium bicarbonate, 2 parts of zinc laurate, 4 parts of nanometre titanium dioxide (particle size 60 to 80 nm), 30 parts of organometallic salts, 4 parts of shell powder, 2 parts of carbon nanotubes (density: 2.1 g/cm$^3$ at 20° C.), 3 parts of talcum powder and 2 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

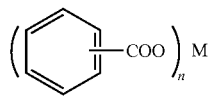

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into the high-speed mixer, where the temperature is increased to 101° C., the mixing speed is 450 r/min, and mixing time is 1.1 hours; after the dispersion, the temperature is reduced to 31° C., the mixing speed is adjusted to 80 r/min, and mixing time is 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −11° C., cooled in vacuum, towed, to obtain the final product.

Example 11

60 parts of PVC resin (polymerization degree is 800, the density is 1.38 g/cm$^3$), 20 parts of activated calcium carbonate, 2 parts of plant fiber (mixture of bagasse, cotton and crop straw), 9 parts of calcium stearate, 2 parts of barium sulfate, 12 parts of paraffin, 1 part of sodium bicarbonate, 2 parts of zinc laurate, 4 parts of nanometre titanium dioxide (particle size 60 to 80 nm), 30 parts of organometallic salts, 4 parts of shell powder, 2 parts of carbon nanotubes (density: 2.1 g/cm$^3$ at 20° C.), 3 parts of talcum powder and 2 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

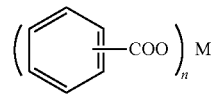

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into the high-speed mixer, the temperature is increased to 90° C., the mixing speed is 450 r/min, and mixing time is 2 hours; after the dispersion, the temperature is reduced to 35° C., the mixing speed is adjusted to 120 r/min, and mixing time is 35 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −13° C., cooled in vacuum, towed, to obtain the final product.

Example 12

60 parts of PVC resin (polymerization degree is 1200, the density is 1.38 g/cm$^3$), 25 parts of activated calcium carbonate, 3.5 parts of plant fiber (mixture of bagasse, cotton and crop straw), 10 parts of calcium stearate, 2 parts of barium sulfate, 14 parts of paraffin, 2 parts of sodium bicarbonate, 3 parts of zinc laurate, 3 parts of nanometre titanium dioxide (particle size 60 to 80 nm), 30 parts of organometallic salts, 3 parts of shell powder, 3 parts of carbon nanotubes (density: 2.1 g/cm³ at 20° C.), 3 parts of talcum powder and 3 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

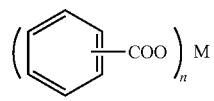

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into the high-speed mixer, where the temperature is increased to 101° C., the mixing speed to 450 r/min, and mixing time is 1.1 hours; after the dispersion, the temperature is reduced to 31° C., the mixing speed is adjusted to 80 r/min, and mixing time is 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −11° C., cooled in vacuum, towed, to obtain the final product.

Example 13

60 parts of PVC resin (polymerization degree is 1200, the density is 1.38 g/cm³), 23 parts of activated calcium carbonate, 4 parts of plant fiber (mixture of bagasse, cotton and crop straw), 9 parts of calcium stearate, 5 parts of barium sulfate, 15 parts of paraffin, 1.5 parts of sodium bicarbonate, 4 parts of zinc laurate, 6 parts of nanometre titanium dioxide (particle size 60 to 80 nm), 30 parts of organometallic salts, 6 parts of shell powder, 3 parts of carbon nanotubes (density: 2.1 g/cm³ at 20° C.), 4 parts of talcum powder and 3 parts of stabilizer (Barium-Zinc stabilizer, liquid) are provided, wherein the organometallic salts is benzoic acid metal salt mixture (purchased from Adamant Technological Environmental, forming agent, catalogue no.: WY-68) which has the following formula:

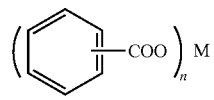

wherein n=1, 2 or 3; M is selected from cations including copper, iron, zinc, magnesium, calcium, etc.; wherein the benzoic acid metal salt mixture includes one or more of benzoic acid metal salt, dibenzoic acid metal salt, tribenzoic acid metal salt or any combination thereof; and according to the mass percentage, the amount of benzoic acid metal salt in organometallic salt is in a range from 70% to 80% by weight, and the dibenzoic acid metal salt is from 60% to 70% by weight of the remaining benzoic acid metal salt mixture other than the benzoic acid metal salt.

The above-mentioned materials are added into the high-speed mixer, where the temperature is increased to 101° C., the mixing speed is 450 r/min, and mixing time is 1.1 hours; after the dispersion, the temperature is reduced to 31° C., the mixing speed is adjusted to 80 r/min, and mixing time is 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −11° C., cooled in vacuum, towed, to obtain the final product.

Comparative Example 1

58 parts of PVC resin (polymerization degree is 1400, the density is 1.38 g/cm³), 17 parts of activated calcium carbonate, 3 parts of plant fiber (mixture of bagasse, cotton and crop straw), 6 parts of calcium stearate, 3 parts of barium sulfate, 13 parts of paraffin, 1.5 parts of sodium bicarbonate, 2.5 parts of zinc laurate, 3 parts of nanometre titanium dioxide (particle size 60 to 80 nm), 5 parts of shell powder, 2 parts of carbon nanotubes (density: 2.1 g/cm³ at 20° C.), 3 parts of talcum powder and 2 parts of stabilizer (Barium-Zinc stabilizer, liquid) are provided.

The above-mentioned materials are added into the high-speed mixer, where the temperature is increased to 101° C., the mixing speed is 450 r/min, and mixing time is 1.1 hours; after the dispersion, the temperature is reduced to 31° C., the mixing speed is 80 r/min, and mixing time is 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −11° C., cooled in vacuum, towed, to obtain the final product.

Comparative Example 2

74 parts of PVC resin (polymerization degree is 1100, the density is 1.38 g/cm³), 32 parts of activated calcium carbonate, 6.5 parts of plant fiber (mixture of bagasse, cotton and crop straw), 14 parts of calcium stearate, 8 parts of barium sulfate, 18 parts of paraffin, 2 parts of sodium bicarbonate, 4 parts of zinc laurate, 6 parts of nanometre titanium dioxide (particle size 60 to 80 nm), 12 parts of plasticizers, 6 parts of shell powder, 6 parts of carbon nanotubes (density: 2.1 g/cm³ at 20° C.), 5 parts of talcum powder and 4 parts of stabilizer (Barium-Zinc stabilizer, liquid) are provided.

The above-mentioned materials are added into the high-speed mixer, the temperature is increased to 110° C., the mixing speed is 400 r/min, and mixing time is 1.5 hours; after the dispersion, the temperature is reduced to 35° C., the mixing speed is adjusted to 105 r/min, and mixing time is 40 minutes to obtain the mixture.

The obtained mixture is extruded and shaped by twin-screw extruder, and the profile is obtained after water cooling. The settings of twin-screw extruder are: 110 to 120° C. (zone 1), 125 to 135° C. (zone 2), 140 to 150° C. (zone 3), 165 to 175° C. (zone 4), and 105 to 110° C. (confluence core); the profile is sent to −15° C., cooled in vacuum, towed, to obtain the final product.

The performance tests were carried out on the PVC final products prepared in the comparison 1 to 2 and the embodiments 1 to 13, and the results are shown in table-1.

TABLE 1

Performance tests of Comparative Examples 1 to 2 and Examples 1 to 13

| | tensile strength (MPa) | elongation at break (%) | Processing temperature (° C.) | impact strength (KJ/m$^2$) | Exudation rate (%) |
|---|---|---|---|---|---|
| Example 1 | 55.6 | 283.6 | 150 | 39.2 | 2 |
| Example 2 | 53.8 | 235.9 | 170 | 33.1 | 8 |
| Example 3 | 53.9 | 256.1 | 160 | 36.3 | 7 |
| Example 4 | 52.6 | 223.6 | 180 | 32.7 | 9 |
| Example 5 | 52.3 | 221.5 | 175 | 34.5 | 10 |
| Example 6 | 53.2 | 227.8 | 170 | 32.1 | 12 |
| Example 7 | 50.6 | 217.1 | 185 | 31.9 | 13 |
| Example 8 | 48.7 | 190.5 | 175 | 31.1 | 16 |
| Example 9 | 46.3 | 185.3 | 180 | 29.7 | 18 |
| Example 10 | 44.5 | 180.2 | 185 | 27.8 | 21 |
| Example 11 | 42.6 | 160.4 | 190 | 26.3 | 23 |
| Example 12 | 65 | 335.7 | 150 | 51.3 | 0.3 |
| Example 13 | 54.8 | 274.9 | 160 | 37.8 | 1.5 |
| Comparative Example 1 | 34.3 | 130.6 | 180 | 24.9 | 25 |
| Comparative Example 2 | 36.7 | 140.8 | 185 | 25.7 | 27 |

*Test conditions for the exudation rate: the exudation mass to the original total mass of the composite material is measured under the dry condition and the temperature from 50 to 60° C. after 2 weeks; the processing temperature is the temperature of the barrel during the injection process.

According to the above data, with the addition of the organometallic salt, the improvement of the coordination relationship between each substance in the material might be due to the change of the reaction site with PVC. Compared with the comparative examples, the organometallic composite material possesses with higher tensile strength, elongation at break and significantly lower exudation rate. Therefore, the composite material has not only lower processing temperature, but also better toughness and is not easy to break.

The invention claimed is:

1. A method for preparing a composite material, comprising:
providing a PVC resin, an activated calcium carbonate, a plant fiber, calcium stearate, barium sulfate, paraffin wax, sodium bicarbonate, zinc laurate, nanometer-sized titanium dioxide, an organometallic salt, shell powder, carbon nanotubes, talcum powder, and a stabilizer to create a first mixture;
mixing and heating the first mixture to obtain a second mixture;
extruding the second mixture to obtain a molded article;
subjecting the molded article to a first cooling to obtain a cooled molded article;
subjecting the cooled molded article to a second cooling under vacuum to obtain the composite material.

2. The method of claim 1, wherein the organometallic salt is a benzoic acid metal salt represented by the following formula:

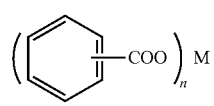

wherein n=1, 2 or 3; M is selected from copper, iron, zinc, magnesium, calcium, or combinations thereof.

3. The method of claim 1, wherein the PVC resin is from 50 to 70 parts by mass; the activated calcium carbonate is from 16 to 30 parts by mass; the plant fiber is from 2 to 6 parts by mass; the calcium stearate is from 4 to 14 parts by mass; the barium sulfate is from 2 to 8 parts by mass; the paraffin wax is from 12 to 18 parts by mass; the sodium bicarbonate is from 1 to 3 parts by mass; the zinc laurate is from 2 to 6 parts by mass; the nanometer-sized titanium dioxide is from 4 to 8 parts by mass; the organometallic salt is from 10 to 50 parts by mass; the shell powder is from 4 to 8 parts by mass; the carbon nanotubes are from 2 to 4 parts by mass; the talcum powder is from 3 to 5 parts by mass; and the stabilizer is from 2 to 4 parts by mass.

4. The method of claim 2, wherein the PVC resin is from 50 to 70 parts by mass; the activated calcium carbonate is from 16 to 30 parts by mass; the plant fiber is from 2 to 6 parts by mass, the calcium stearate is from 4 to 14 parts by mass; the barium sulfate is from 2 to 8 parts by mass; the paraffin wax is from 12 to 18 parts by mass; the sodium bicarbonate is from 1 to 3 parts by mass; the zinc laurate is from 2 to 6 parts by mass; the nanometer-sized titanium dioxide is from 4 to 8 parts by mass; the organometallic salt is from 10 to 50 parts by mass; the shell powder is from 4 to 8 parts by mass; the carbon nanotubes are from 2 to 4 parts by mass; the talcum powder is from 3 to 5 parts by mass; and the stabilizer is from 2 to 4 parts by mass.

5. The method of claim 1, wherein the mixing and heating comprises mixing at a first speed from 400 to 500 r/min for 1 to 2 hours at a first temperature from 100 to 120° C., followed by mixing at a second speed from 80 to 120 r/min for 30 to 50 minutes at a second temperature from 30 to 40° C., and wherein said extruding is performed at different temperatures according to different zones: 110 to 120° C. in zone 1; 125 to 135° C. in zone 2; 140 to 150° C. in zone 3; 165 to 175° C. in zone 4; and 105 to 110° C. in a confluence core, and wherein said first cooling is water cooling, and wherein said second cooling under vacuum has a temperature from −10 to −15° C.

6. The method of claim 1, wherein the mixing and heating comprises mixing at a speed of 450 r/min for 1.1 hours at a temperature of 101° C., followed by mixing at a speed of 80 r/min for 40 minutes at a temperature of 31° C.

7. A composite material prepared by the method according to claim 1,
wherein the PVC resin is from 50 to 70 parts by mass; the activated calcium carbonate is from 16 to 30 parts by mass; the plant fiber is from 2 to 6 parts by mass; the calcium stearate is from 4 to 14 parts by mass; the barium sulfate is from 2 to 8 parts by mass; the paraffin wax is from 12 to 18 parts by mass; the sodium bicarbonate is from 1 to 3 parts by mass; the zinc laurate is from 2 to 6 parts by mass; the nanometer-sized titanium dioxide is from 4 to 8 parts by mass; the organometallic salt is from 10 to 50 parts by mass; the shell powder is from 4 to 8 parts by mass; the carbon nanotube is from 2 to 4 parts by mass; the talcum powder is from 3 to 5 parts by mass; and the stabilizer is from 2 to 4 parts by mass.

8. The composite material according to claim 7, wherein the organometallic salt is a benzoic acid metal salt represented by the following formula:

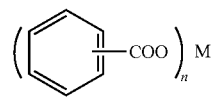
wherein n=1, 2 or 3; M is selected from copper, iron, zinc, magnesium, calcium, or combinations thereof.
9. The composite material according to claim 7, wherein the material has an exudation rate from 0.3% to 15%.
10. The composite material according to claim 8, wherein the material has an exudation rate from 0.3% to 15%.
* * * * *